No. 807,350. PATENTED DEC. 12, 1905.
W. F. BEASLEY.
RESILIENT TIRE AND MEANS FOR SECURING SAME IN PLACE.
APPLICATION FILED FEB. 20, 1903.
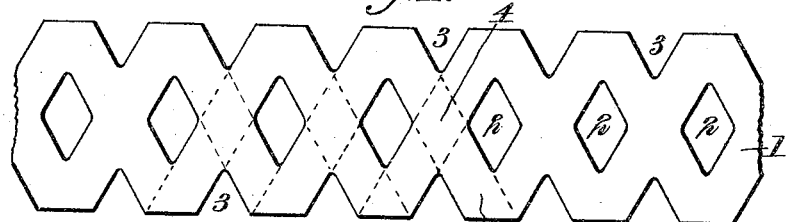
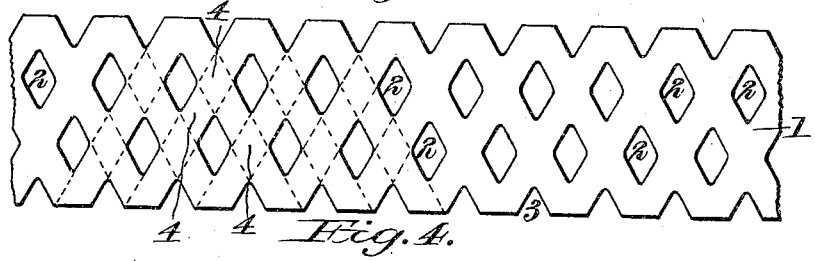
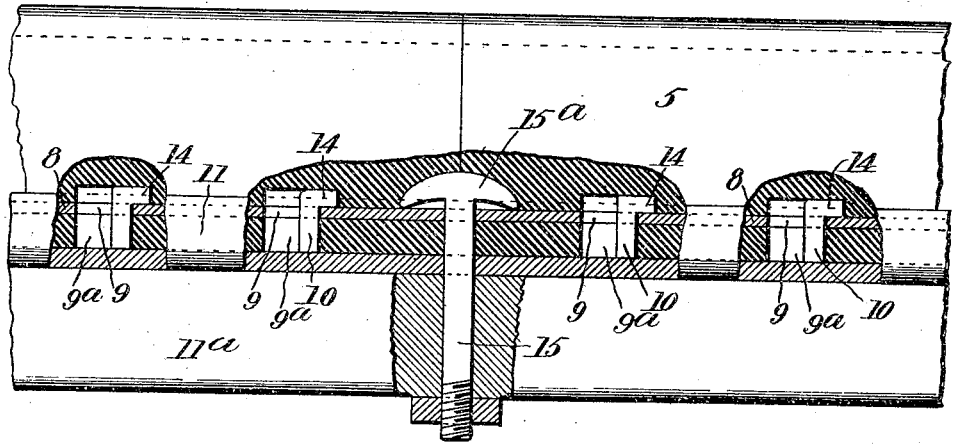
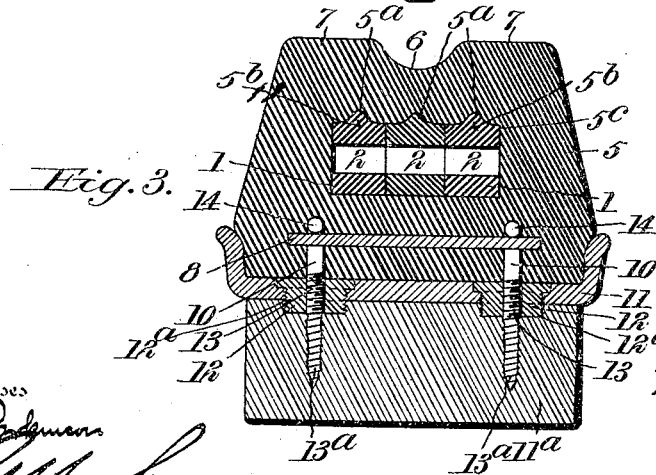
Inventor
William F. Beasley
by
his Attorney
Witnesses

UNITED STATES PATENT OFFICE.

WILLIAM F. BEASLEY, OF PLYMOUTH, NORTH CAROLINA.

RESILIENT TIRE AND MEANS FOR SECURING SAME IN PLACE.

No. 807,350. Specification of Letters Patent. Patented Dec. 12, 1905.

Application filed February 20, 1903. Serial No. 144,337.

*To all whom it may concern:*

Be it known that I, WILLIAM F. BEASLEY, a citizen of the United States of America, and a resident of Plymouth, county of Washington, State of North Carolina, have invented certain new and useful Improvements in Resilient Tires and Means for Securing Same in Place, of which the following is a specification.

My invention relates to certain new and useful improvements in tires for vehicles, the elasticity of which is provided for by the use of a resilient material, such as rubber or rubber composition.

A solid-rubber tire is deficient in elasticity, and the problem here sought to be solved is to so construct a tire that resiliency may be obtained without the necessity and expense of using the better grades of rubber and at the same time to provide a construction which insures the life of the rubber for the greatest length of time. It is, moreover, desirable that the resiliency of the tire be obtained by a part other than the part which receives the wear, as a perfect wearing-surface has requirements incompatible or at least difficult to secure simultaneously with perfect resiliency and that the resilient section be so constructed as to permit its removal from the wearing casing or section when it has lost its resiliency and its replacement by a new section. This is an obvious advantage. It is further desirable that the wearing-casing above specified may be readily removed from and replaced upon the wheel in order to permit the assemblage and reassemblage of the parts of the tire.

For the purpose above set forth my invention comprises a resilient section consisting of a strip or a plurality of strips of rubber or rubber composition, each strip having formed therein from side to side a series or a plurality of series of rhombic apertures and having in its outer and inner surfaces wedge-shaped notches, the notches being so disposed in respect to the apertures as to form with them a series of transverse diagonal or trussed walls to receive the thrust of the weight of the wheel to which the tire may be applied and to transmit it circumferentially therearound, the apertures permitting a distortion of these walls to a greater or less extent to give increased resiliency. A resilient section of the construction specified may be formed by itself, so constructed as to permit it to be inserted into a wearing section or casing which is made hollow to receive it.

Another feature of my invention consists in constructing the wearing-section with a metal ribbon embedded in the material thereof, near the rim-surface, the ribbon being provided with a series of elongated slots registering with corresponding notches in the wearing-section. Into these slots headed studs upon the rim of the wheel may be inserted and the tire firmly held in place by the partial rotation thereof in respect to the wheel, whereby the headed studs may be caused to lock with the metallic band.

My invention further consists in the construction, arrangement, and combination of the several parts of which it is composed, as will be hereinafter more fully set forth.

Referring to the accompanying drawings, in which corresponding parts are designated by similar marks of reference, Figure 1 is a side elevation of a portion of a resilient section constructed in accordance with this invention. Fig. 2 is a similar view showing a modified form thereof. Fig. 3 is a transverse section of a completed tire having my invention applied thereto and showing a resilient section placed in a wearing-section, as well as showing a rim of a wheel and my improved means for securing the tire thereon. Fig. 4 is a side elevation, partly in section, of the device illustrated in Fig. 3 and also showing the means for securing the ends of the tire.

The resilient section 1 consists of a band of rubber or rubber composition of substantially rectangular cross-section, by preference molded directly to the shape or stamped from sheet-rubber of suitable thickness. It is to be understood that the strip is to be either formed straight and afterward bent to fit the periphery of the wheel or may be formed directly into circular shape. A series of rhombic apertures 2 are formed in the body of this strip (see Fig. 1) extending from side to side thereof, while the inner and outer surfaces of the strip are provided with a series of wedge-shaped notches 3, which, together with the rhombic apertures, form in the strip a double series of transverse diagonal trussed walls 4, (the two series being indicated in certain parts in Fig. 1 by dotted lines,) which trussed walls serve to transmit the weight of the wheel circumferentially around the tire, as has been already stated.

Instead of using a single series of rhombic apertures a plurality of such series may be used. Thus in Fig. 2 I have shown two series of apertures, the apertures of the several series being diagonally disposed with respect to each other and to the wedge-shaped notches, so that a number of sets of intersecting trussed walls are formed by the apertures and the wedge-shaped surface notches.

I prefer to round off all corners of the rhombic apertures, so as to do away with sharp points, which have a tendency to start the tearing of the rubber composition; but I do not carry this rounding to an extent sufficient to cause a substantial loss of the rhombic shape of the apertures, as I consider that shape of value, inasmuch as it provides for the construction of diagonal trussed walls having substantially the same thickness throughout. It will be seen that by my construction are provided a plurality of series of intersecting trussed walls and that their intersection in the central part of the resilient section prevents the bending of the medial portions of the trussed walls when under pressure.

A resilient section may consist of a single strip, such as that above described, or, if desired, of a plurality of such strips laid side by side, as indicated in Fig. 3.

The resilient section above described is inclosed in a wearing section or casing 5, which is preferably constructed with a flat tread and with a central cavity $5^c$ to receive the resilient section, which may be slipped in from one end. By preference the cavity of the wearing-section is provided in its upper surface with circumferential grooves $5^a$, into which corresponding flanges $5^b$ upon the resilient section enter, so that side play of the resilient section in the wearing-casing is prevented.

In order to prevent side slipping of a wheel having my improved tire thereon, I form in the tread-surface of the wearing-casing a circumferential depression or chamber 6, bounded on each side by annular flanges 7, which flanges overlap the resilient section of the tire, so that a part of each of the flanges is supported entirely by the solid material of the wearing-section, while another portion of the flange is supported by the resilient section. As these two supports are of different strength and rigidity, it follows that the outer edges of the tread-faces bear upon the roadway with greater pressure than the inner edges of the faces. This differential pressure on the face of the flanges, in combination with the channel between the flanges, causes the tire to properly bite against sidewise movement, while the same time the resilient section is sufficiently under compression to relieve the wearing-section more or less.

To provide means whereby the tire already described may be readily secured to the wheel, I form in the wearing-section, near the inner surface thereof, a metal ribbon 8, provided at regular intervals with elongated slots 9, the material of the tire having corresponding slots $9^a$ therein registering with those in the ribbon and extending to the inner surface of the tire. Upon the rim of the wheel is placed at corresponding distances apart a series of studs 10, provided with threaded shanks taking into the wood of the wheel-rim $11^a$. As these wooden rims are generally surrounded by a thin metallic tire 11, (around which the resilient tire is secured,) I by preference form bushings 12 for the studs by providing sleeves externally threaded, as at $12^a$, to take into apertures in the metallic rim (by which means, if desired, the metallic rim can be secured to the wooden rim) and an internal thread to receive the corresponding thread upon the shank of the headed stud and form upon the shanks of the studs two series of threads, one, 13, to engage the internal thread of the bushings, and the other, $13^a$, to take into the wooden rim.

Each of the studs 10 is provided with a head 14, the heads of the several studs upon a rim being located in the plane of revolution of the wheel and being all pointed in the same direction. The resilient tire constructed as described is placed upon the metal rim with the heads 14 of the studs in the elongated slots $9^a$ therein, and by then giving a partial rotation to the resilient tire the heads of these studs are drawn over the perforate portion of the metal ribbon 8, (see Fig. 4,) after which the two ends of the tire may be secured together and to wheel-rim by means of the clamp-bolt 15, the head $15^a$ of which engages two ends of the metallic ribbon at the point where the resilient tire is jointed, whereby it is prevented when the wheel is in use from rotating rearwardly on the wheel to unlock. The clamp-bolt is shown and described in my previous application, Serial No. 135,253, filed December 15, 1902. By preference the heads of the bolts are so disposed that the wheel to which they are attached in running forwardly serves to more firmly lock the resilient tire in place.

I am aware that prior to my invention resilient tires have been constructed perforated from side to side with circular apertures, but such tires do not contain my invention, which embraces in one of its features the making of the apertures in rhombic shape, whereby substantially straight walls of uniform thickness are provided around the apertures, thus causing an economy of material of the tire without reduction in strength thereof.

Having thus described my invention, what I claim, and desire to secure by Letters Patent of the United States, is—

1. A resilient tire-section, consisting of a strip having wedge-shaped notches diagonally disposed in its inner and outer faces, and having apertures of substantially rhombic shape formed in its middle portion, whereby a series of intersecting trussed walls are formed, substantially as described.

2. A resilient tire-section, consisting of an elastic strip, having notches in its inner and outer surfaces, and having at its center a plurality of series of apertures of substantially rhombic shape, the apertures of the several series and the notches being disposed in diagonal lines across the strip, whereby a series of intersecting trussed walls are formed, substantially as described.

3. In a resilient tire, the combination with a resilient section consisting of a strip having wedge-shaped notches diagonally disposed in its inner and outer faces, and having apertures of substantially rhombic shape formed in its middle portion, whereby a series of intersecting trussed walls are formed, and a wearing-casing surrounding the resilient section and separate therefrom, substantially as described.

4. In a resilient tire, the combination with a wearing-casing, having a central cavity, of a resilient section removably contained therein and consisting of a strip having wedge-shaped notches diagonally disposed in its inner and outer faces, and having apertures of substantially rhombic shape formed in its middle portion, whereby a series of intersecting trussed walls are formed, substantially as described.

5. In a resilient tire, the combination with a wearing-casing having a central cavity therein, the outer wall of the cavity being provided with a plurality of circumferential grooves, of a resilient section consisting of a plurality of strips, said strips having circumferential flanges thereon, interlocking with the said grooves, substantially as described.

6. In a resilient tire, the combination with a resilient section, of a wearing-section having a flat tread encircled by a circumferential channel forming flanges at the edges of the tread, a portion of each of the flanges being supported entirely by the material of the wearing-section and another portion of the flanges being supported by the resilient section which has less rigidity than the support formed by material of the wearing-section, substantially as described.

7. The combination with a tire having embedded therein a metallic ribbon, the ribbon and the material of the inner face of the tire being each provided with a series of elongated slots, of a wheel-rim, having a series of headed threaded studs thereon the heads of the studs being located in the plane of revolution of the tire, and pointed in the same direction therein, and means for locking the tire on the wheel against rotation, substantially as described.

8. The combination with a resilient tire having a metallic ribbon embedded therein, the ribbon and the inner face of the tire being provided with a series of registering elongated slots, of a wheel-rim, a metallic tire on the wheel-rim, bushings having external and internal threads mounted in the metallic tire, a series of headed studs, the shanks of which are provided with threads to take into the internal threads of the bushings and with threads to take into the wooden wheel-rim, the heads of the said studs entering the said slots in the resilient tire, and means for preventing rotation of the resilient tire on the wheel-rim, substantially as described.

9. A tire having a metallic ribbon therein, in combination with means for securing the ends of the tire together, said means consisting of a clamping-bolt provided with a head having a concave under surface forming biting edges adapted to engage the ends of the metallic ribbon when the ends are brought together in placing the tire on the wheel, substantially as described.

10. A resilient tire-section, consisting of a strip having apertures of substantially rhombic shape formed in its middle portion, whereby a series of intersecting trussed walls are formed, substantially as described.

Signed by me at Washington, District of Columbia, this 10th day of February, 1903.

WILLIAM F. BEASLEY.

In presence of—
  VERNON M. DORSEY,
  S. V. HUGHES.